United States Patent
Al Saud et al.

(10) Patent No.: US 12,508,548 B2
(45) Date of Patent: Dec. 30, 2025

(54) THERMOCOUPLE-BASED DISTILLATION MODULE AND METHOD

(71) Applicants: KING ABDULLAH UNIVERSITY OF SCIENCE AND TECHNOLOGY, Thuwal (SA); UNIVERSITY OF JEDDAH, Jeddah (SA)

(72) Inventors: Khaled bin Bandar Al Saud, Thuwal (SA); Ahmad Alsaadi, Jeddah (SA); Noreddine Ghaffour, Thuwal (SA)

(73) Assignees: KING ABDULLAH UNIVERSITY OF SCIENCE AND TECHNOLOGY, Thuwal (SA); UNIVERSITY OF JEDDAH, Jeddah (SA)

( * ) Notice: Subject to any disclaimer, the term of this patent is extended or adjusted under 35 U.S.C. 154(b) by 221 days.

(21) Appl. No.: 17/777,407

(22) PCT Filed: Nov. 19, 2020

(86) PCT No.: PCT/IB2020/060917
§ 371 (c)(1),
(2) Date: May 17, 2022

(87) PCT Pub. No.: WO2021/105826
PCT Pub. Date: Jun. 3, 2021

(65) Prior Publication Data
US 2022/0401881 A1  Dec. 22, 2022

Related U.S. Application Data

(60) Provisional application No. 62/940,141, filed on Nov. 25, 2019.

(51) Int. Cl.
*B01D 61/36* (2006.01)
*C02F 1/44* (2023.01)

(52) U.S. Cl.
CPC ......... *B01D 61/366* (2013.01); *B01D 61/364* (2013.01); *B01D 61/368* (2013.01);
(Continued)

(58) Field of Classification Search
None
See application file for complete search history.

(56) References Cited

U.S. PATENT DOCUMENTS

| | | |
|---|---|---|
| 9,850,145 B2 | 12/2017 | Thomas et al. |
| 2019/0299164 A1* | 10/2019 | Khalifa ............... B01D 61/364 |
| 2019/0344193 A1 | 11/2019 | Chardon et al. |

FOREIGN PATENT DOCUMENTS

| | | |
|---|---|---|
| CN | 203155103 U | 8/2013 |
| CN | 109012200 A | 12/2018 |

OTHER PUBLICATIONS

International Search Report in corresponding/related International Application No. PCT/IB2020/060917, date of mailing Mar. 31, 2021.

(Continued)

*Primary Examiner* — Krishnan S Menon
(74) *Attorney, Agent, or Firm* — PATENT PORTFOLIO BUILDERS PLLC

(57) ABSTRACT

A membrane distillation (MD) module includes a first MD sub-module including a first thermocouple; a second MD sub-module including a second thermocouple; and a distillation membrane sandwiched between the first MD sub-module and the second MD sub-module. A hot chamber of the first MD sub-module is closed by the distillation membrane, and a cold chamber of the second MD sub-module is closed by the distillation membrane.

16 Claims, 18 Drawing Sheets

(52) U.S. Cl.
CPC ........ *C02F 1/447* (2013.01); *B01D 2311/103* (2013.01); *B01D 2311/106* (2013.01); *B01D 2313/22* (2013.01); *B01D 2317/04* (2013.01); *C02F 2209/02* (2013.01)

(56) References Cited

OTHER PUBLICATIONS

Written Opinion of the International Searching Authority in corresponding/related International Application No. PCT/IB2020/060917, date of mailing Mar. 31, 2021.

\* cited by examiner

TABLE - I

| Voltage applied (V) | Energy (W) | Current (A) | Temperature of Water (°C) |
|---|---|---|---|
| 1 | 0.23 | 0.23 | 21.78 |
| 2 | 0.96 | 0.48 | 22.24 |
| 3 | 2.24 | 0.76 | 23.21 |
| 4 | 4.11 | 1.03 | 24.64 |
| 5 | 6.44 | 1.29 | 26.2 |
| 6 | 9.22 | 1.54 | 27.75 |
| 7 | 12.28 | 1.76 | 30.15 |
| 8 | 16.04 | 2.01 | 33.6 |
| 9 | 19.58 | 2.2 | 37.42 |
| 10 | 24.05 | 2.41 | 41.9 |
| 11 | 28.0 | 2.55 | 45.5 |
| 12 | 32.83 | 2.74 | 48.45 |

FIG. 9

TABLE - II

| Voltage applied (V) | (w/hr) Required | | Temperature of Water (°C) | Heat transfer efficiency* |
|---|---|---|---|---|
| | Actual | (calculated) | | |
| 2 | 0.96 | 0.95 | 22.24 | 99.2% |
| 3 | 2.24 | 2.13 | 23.21 | 95.0% |
| 4 | 4.11 | 3.80 | 24.64 | 92.4% |
| 5 | 6.44 | 5.61 | 26.2 | 87.2% |
| 6 | 9.22 | 7.39 | 27.75 | 80.6% |
| 7 | 12.28 | 9.90 | 30.15 | 81.4% |
| 8 | 16.04 | 13.05 | 33.6 | 81.8% |
| 9 | 19.58 | 16.61 | 37.42 | 84.9% |
| 10 | 24.05 | 20.19 | 41.9 | 83.9% |
| 11 | 28.0 | 22.87 | 45.5 | 81.7% |
| 12 | 32.83 | 26.52 | 48.45 | 80.87% |

FIG. 10

TABLE - IIIII

| Voltage applied (V) | Flux (LMH) | Energy consumed by thermocouple (w/hr) | Thermal energy (J/s) | | | Heat energy efficiency* |
|---|---|---|---|---|---|---|
| | | | Vaporization (product) | Waste (discharge) | Total applied | |
| 5 | 0.52 | 12.18 | 0.38 | 26.39 | 43.85 | 61.04% |
| 8 | 1.50 | 31.76 | 1.10 | 43.63 | 114.34 | 39.12% |
| 10 | 3.07 | 48.70 | 2.25 | 48.85 | 175.32 | 29.15% |
| 12 | 5.56 | 66.80 | 4.08 | 60.52 | 240.48 | 26.86% |

*calculated as $E_{efficiency} = \left(\frac{Q_v + Q_w}{Q_t}\right)\%$

FIG. 13

THERMOCOUPLE-BASED DISTILLATION MODULE AND METHOD

CROSS-REFERENCE TO RELATED APPLICATIONS

This application is a U.S. National Stage Application of International Application No. PCT/IB2020/060917, filed on Nov. 19, 2020, which claims priority to U.S. Provisional Patent Application No. 62/940,141, filed on Nov. 25, 2019, entitled "THERMOCOUPLE BASED MEMBRANE DISTILLATION SYSTEM AND METHODS OF USE THEREOF," the disclosures of which are incorporated herein by reference in their entirety.

BACKGROUND

Technical Field

Embodiments of the subject matter disclosed herein generally relate to a system and method for producing a permeate from a feed through a distillation process, and more particularly, to a distillation module that uses a thermocouple for heating the feed while producing the permeate through a water distillation process.

Discussion of the Background

Water is one of the key elements of life and its availability continue to become more scarce for various regions of the Earth. In this regard, renewable fresh water sources form 2.5% of all the water on Earth, which is estimated at about 1386 M $Km^3$ of water. Surface water represents 1.2% of that amount, of which 21.4% is readily available in lakes and rivers. That makes 0.0000642% of all Earth's water sources. On the other hand, saline water makes up to 97.5% of all Earth's water, a staggering ratio of 15,000/1. As the fresh water sources do not keep up with the increased population demand and the industrial utilization, and as the world population grows and the fresh water sources remain unchanged, there is a need to convert more of the saline water into fresh water.

One major form of water treatment is the desalination process, where salt and water are separated from each other to produce potable water. Desalination as a technology is the process of removing salts from water. The majority of desalination techniques are based on three types of processes. The first process is the multi-stage flash (MFS), where the saline feed water is heated in a first chamber and then transported into a second chamber, where the pressure is greatly reduced relative to the first chamber, which results in the flash evaporation of the heated water.

A second process is the multi-effect distillation (MED), in which the feed water is sprayed on steam-containing heating elements, which results in a thin coat of feed over the heating elements. The thin coat of feed is then partially evaporated due to the heat generated by the heating elements. Both of these processes are thermal desalination processes, i.e., the temperature of the feed needs be raised to achieve the evaporation.

Reverse osmosis (RO) is the third process and the most widely spread nowadays. RO is considered a pressure-driven membrane process where the feed is pressured through a membrane to obtain the permeate. There are many other techniques and processes under both thermal and membrane-based desalination and some fall under electrical and physical desalination. RO utilizes a membrane to drive the salt-water separation process under high pressure, requiring only high-grade energy, i.e., electricity. On the other hand, MSF and MED as thermal processes utilize high heat energy to drive the separation process. With this high heat, scaling becomes an issue. As such, membrane distillation (MD), which is a thermally driven membrane process, lies between RO and MSF-MED. It does not require high pressure and may operate under low temperatures.

One of the MD configurations is called the air gap membrane distillation (AGMD), which is shown as system 100 in FIG. 1, and this configuration utilizes a hydrophobic porous membrane 110 in direct contact with a hot chamber 102, which receives a hot feed 103, and in indirect contact with a condensation plate 120, which is in contact with a coolant 121. The membrane 110 is separated by an air gap 112 from the condensation plate 120. Due to the temperature difference between the feed 103 and the coolant 121, water vapor can pass through the membrane 110 and condense on the condensation plate 120. The product water flux 130 depends on the membrane pore size and the feed to coolant temperature gradient.

Factors affecting the product (or permeate) flux are the resistance of the water vapor flow in the air gap 112, its subsequent condensation, and also the thermodynamics of the process. The AGMD can be applied not only to separate salt from seawater, but also to the concentration of acids or removal of volatile organic carbons in the chemical industry, concentration of dairy and juices in the food industry, concentration of wastewater effluent, etc.

While the AGMD technology is advantageous because it exhibits low thermal conduction losses, almost limitless range of coolant options (condensation plate limiting), the possibility of running the feed and coolant in closed loops respectively, and the possibility of utilizing the AGMD configuration as a heat recovery system, the problems associated with the AGMD processes is its low flux, and the fact that it requires a more complex design.

Thus, there is a need for a new MD system that is capable of delivering a high permeate flux while operating at a low energy.

BRIEF SUMMARY OF THE INVENTION

According to an embodiment, there is a membrane distillation (MD) module that includes a first MD sub-module including a first thermocouple, a second MD sub-module including a second thermocouple, and a distillation membrane sandwiched between the first MD sub-module and the second MD sub-module. A hot chamber of the first MD sub-module is closed by the distillation membrane, and a cold chamber of the second MD sub-module is closed by the distillation membrane.

According to another embodiment, there is a membrane distillation (MD) system that includes plural MD sub-modules, each including a thermocouple, and plural distillation membranes interleaved with the plural MD sub-modules so that each distillation membrane of the plural distillation membranes is sandwiched between a hot chamber of a given MD sub-module and a cold chamber of an adjacent MD sub-module of the plural MD sub-modules. The hot chamber is directly facing a hot part of a corresponding thermocouple of the given MD sub-module, and the cold chamber is directly facing a cold part of a corresponding thermocouple of the adjacent MD sub-module.

According to yet another embodiment, there is a portable water purification system that includes a vessel configured to hold a feed, and a distillation module configured to be placed in the feed, inside the vessel. The distillation module includes a chamber separated from the feed by at least a distillation membrane and at least a thermocouple. The thermocouple is configured to heat the feed and cool the chamber to promote water distillation through the distillation membrane so that a permeate is collected inside the chamber.

BRIEF DESCRIPTION OF THE DRAWINGS

For a more complete understanding of the present invention, reference is now made to the following descriptions taken in conjunction with the accompanying drawings, in which:

FIG. 9 is a table that illustrates the correlation between the applied voltage and the temperature of the feed;

FIG. 10 is a table that indicates the heat transfer efficiency of an MD module that uses a thermocouple for various applied voltages;

FIG. 13 illustrates various parameters associated with the permeate generation for the MD module having the thermocouple;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an AGMD configuration. However, the embodiments to be discussed next are not limited to an AGMD system, but may be applied to other desalination systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
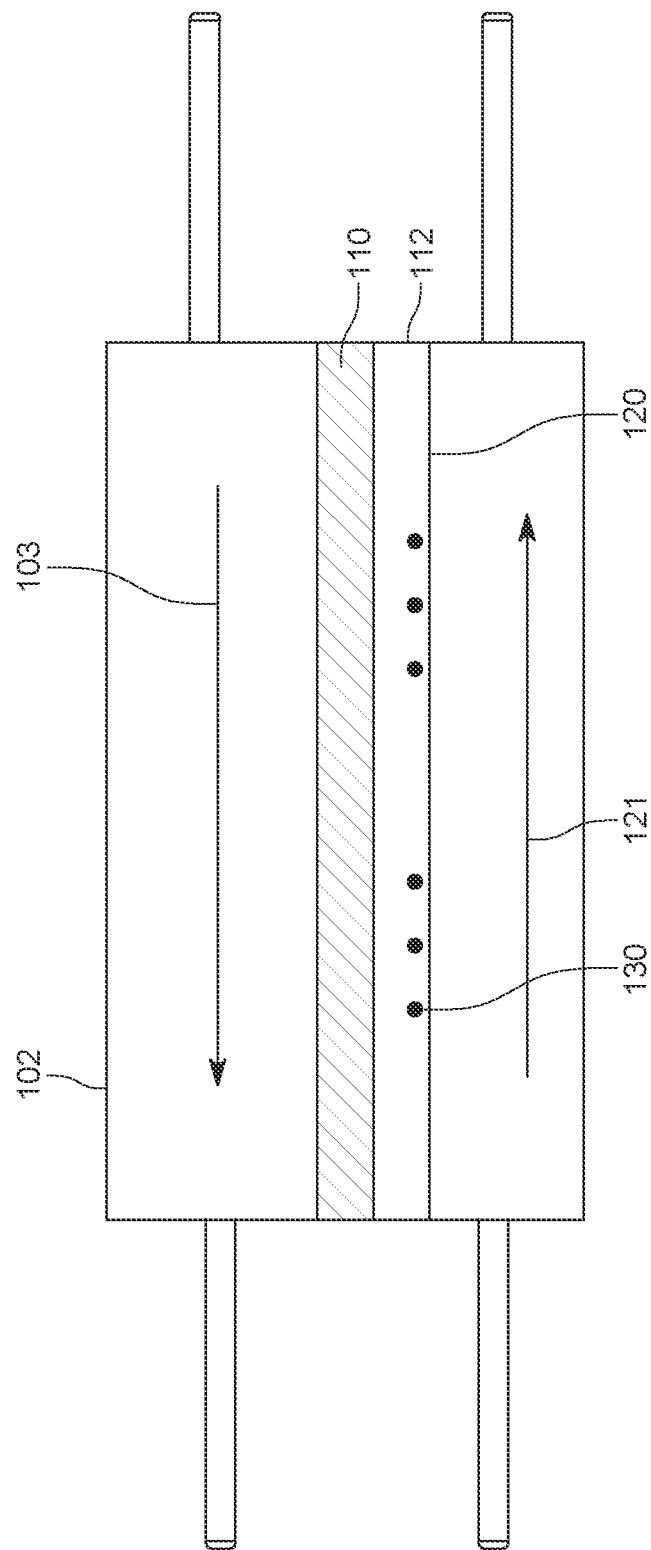
FIG. 1 is a schematic diagram of an air gap membrane distillation system that generates a permeate from a feed when a temperature gradient is generated between the feed and a coolant.
Figure 2:
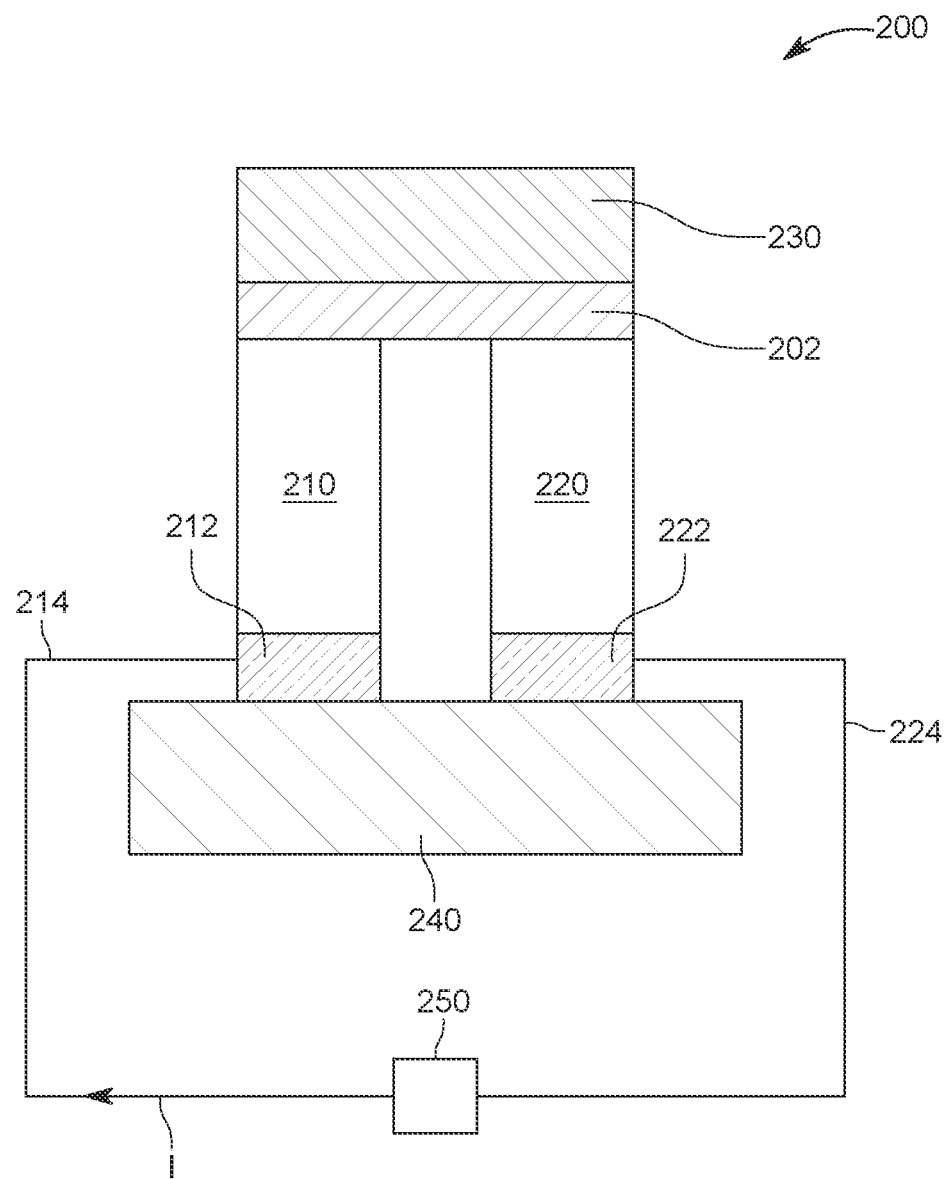
FIG. 2 illustrates a thermocouple that is capable of heating one side and cooling the other side when an electrical current is supplied, or generating the electrical current when the two sides are heated and cooled, respectively.

According to an embodiment, an MD module includes a membrane sandwiched between two sub-modules, and each sub-module includes a thermocouple. A thermocouple 200 is illustrated in FIG. 2 and it includes first and second conductors (or semiconductors) 210 and 220, that are electrically connected in series and thermally connected in parallel to each other. The thermocouple 200 has the top ends of the first and second conductors 210 and 220 being connected to a common conductor 202, which in turn is connected to a first thermal reservoir 230, for example, a material that has a high thermal conductivity (e.g., a metal). The bottom ends of the first and second conductors 210 and 220 may be connected to corresponding electrical pads 212 and 222, which in turn are connected to corresponding leads 214 and 224. The pads 212 and 222 are thermally connected to a second thermal reservoir 240, and electrically connected, through the leads 214 and 224, to a device 250.

If the device 250 is a load, for example, a light generator like a bulb light or an LED, or any other device that uses electrical power, and heat is transferred to the first thermal reservoir 230 and heat is removed from the second thermal reservoir, so that the top parts of the first and second conductors are at a higher temperature than the bottom parts of the first and second conductors, than due to the Seebeck effect, an electrical current I appears in the electrical circuit formed by the leads 214, 224, the pads 212, 222, the first and second electrical conductors 210, 220, and the common conductor 202. This means that only due to the temperature difference between the ends of the first and second electrical conductors 210 and 220, the electrical current I is generated and this current can be used to power the load 250.

Alternatively, if the device 250 is a power source, that generates the electrical current I, then the circulation of this current through the electrical circuit configuration shown in FIG. 2 makes the second thermal reservoir 240 to heat up and the first thermal reservoir 230 to cool down, due to the Peltier effect. For these reasons, the thermoelement 200 shown in FIG. 2 can be used to heat the feed in a distillation module and/or the cool the permeate as now discussed.

Figure 3:
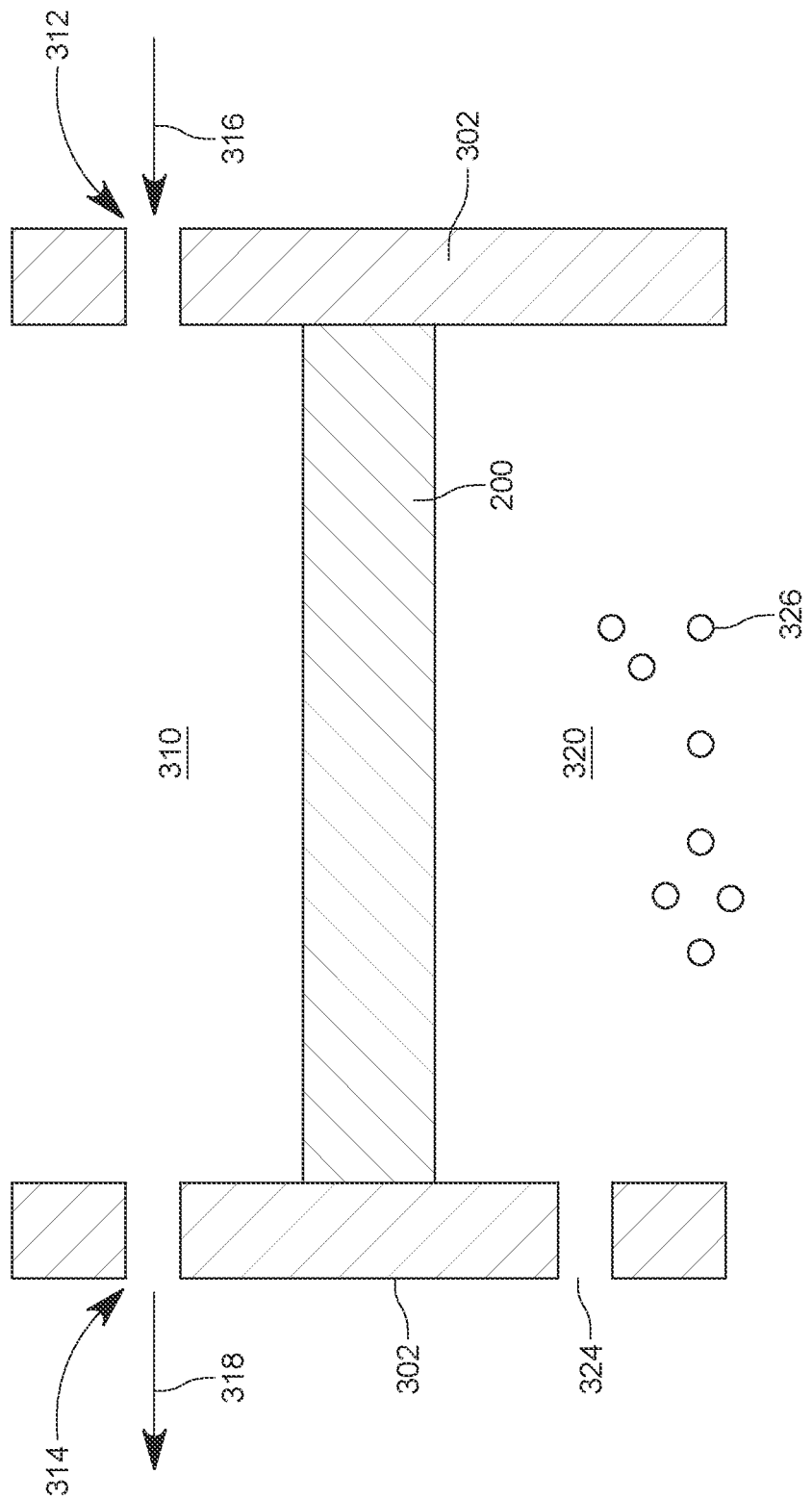
FIG. 3 illustrates an MD sub-module that includes a corresponding thermocouple.

The thermocouple 200 may be implemented in various configurations into an AGMD system, and a couple of these implementations are now discussed. However, those skilled in the art would understand that there are other possible implementations of the thermocouple in an MD system that would become apparent from the present disclosure. FIG. 3 shows a first configuration of an MD sub-module 300 that includes the thermocouple 200 sandwiched between a hot chamber 310 and a cold chamber 320. Note that the thermocouple 200 may have any configuration, not only that shown in FIG. 2, as long as either the Seebeck or the Peltier effect are applicable to this configuration.

The walls 302 of the two chambers may be made of any desired material, for example, a composite material. The hot chamber 310 is configured to be heated by the first thermal reservoir of the thermocouple and the cold chamber 320 is configured to be cooled by the second thermal reservoir of the thermocouple. For this reason, these two chambers are called herein hot and cold chambers. One skilled in the art would understand that the role of the two chambers can be reversed without changing the operation principle of the sub-module. In the embodiment shown in FIG. 3, the two chambers are open to the ambient, i.e., they are not fully closed. This means that if a feed 316 is injected at an inlet 312 as shown in the figure, the feed is likely to leak out of the hot chamber 310. The same is true for the cold chamber.

The hot chamber 310 has one or more inlets 312 (only one is shown for simplicity) for receiving the feed 316 and one or more outlets 314 (only one is shown for simplicity) for outputting a brine 318 formed after the fresh water is extracted from the feed 316. In this example, for simplicity, the feed is considered to be seawater at ambient temperature, but any other types of feeds may be used. A feed at the ambient temperature is defined herein to include a feed that is not preheated, or a feed that is preheated with low-grade energy, e.g., a discharge from a thermal plant. In this embodiment, the cold chamber 320 has one or more outlets 324, but no inlets. The cold chamber 320 does not need to have an inlet as the vapor 326 is passing through a membrane (not shown) from another hot chamber, and thus, the vapor 326 needs only to be condensed and then collected outside the sub-module and no liquid needs to be supplied into the cold chamber 320. However, in one embodiment, as discussed later, permeate from another sub-module or cooling water may also be supplied to the cold chamber, and for that application, an inlet would be necessary. A length of the sub-module 300 is about 0.5 m in this embodiment, and all the other sizes are smaller than the length. However, smaller or larger lengths may be used. In one embodiment, the length of the sub-module can be up to 3.6 m.

Figure 4:
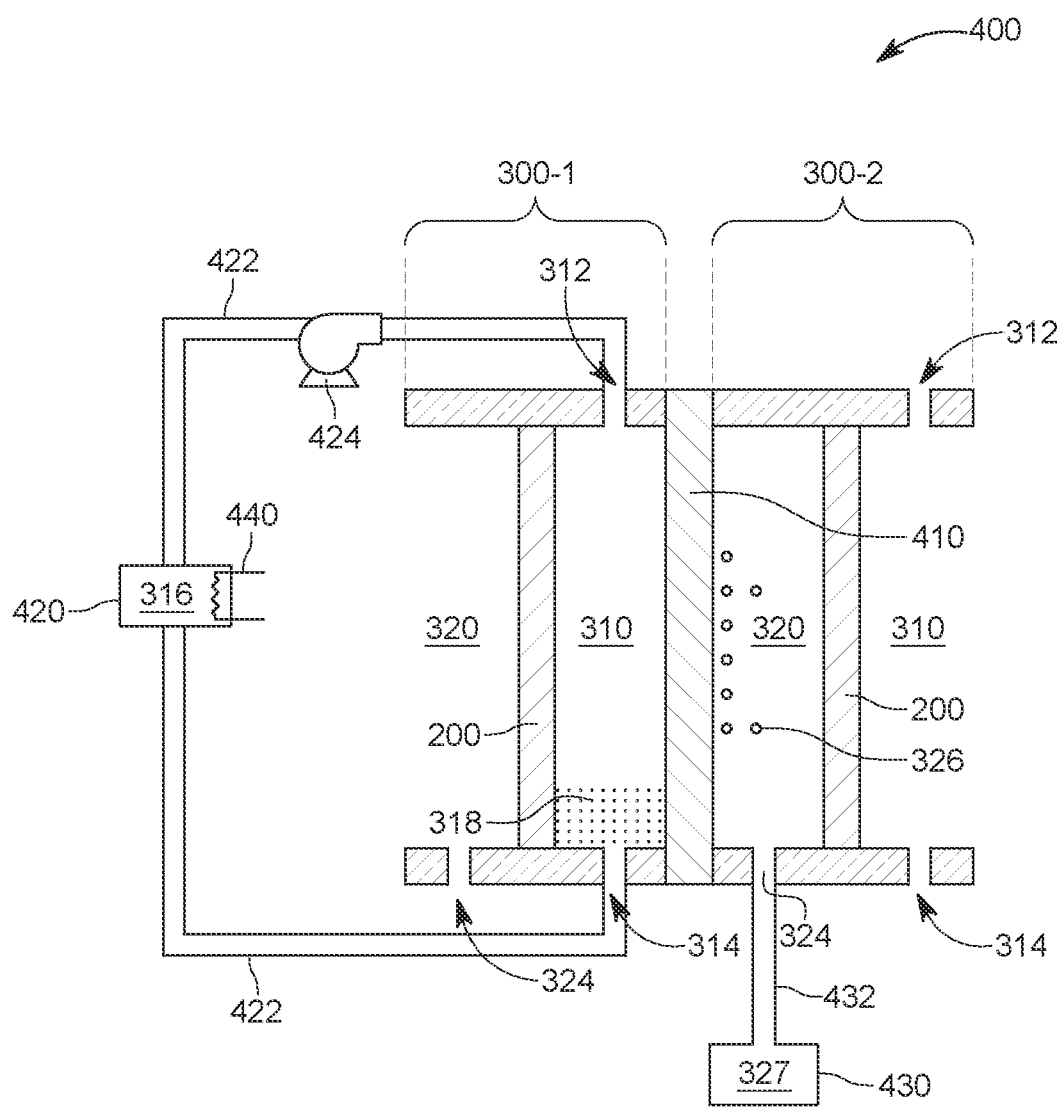
FIG. 4 illustrates an MD module that includes two MD sub-modules and generates a permeate from a feed when the thermocouples heat the feed and cool the permeate.

The MD sub-module 300 needs to be paired with a similar sub-module 300 (called herein a first sub-module 300-1 and a second sub-module 300-2) and a membrane 410 needs to be added between the two sub-modules, as shown in FIG. 4, for obtaining a fully functional MD module 400. The hot side of the second sub-module 300-2 needs to be cooled with an external loop or other means so that energy is dissipated, which prevents the thermocouple from heating up on both sides. By placing the hot chamber 310 of the first sub-module 300-1 directly against the hydrophobic layer of the membrane 410, the open side of the hot chamber is sealed from the outside, and thus, any feed that is inserted at inlet 312, would not leak outside. Note that the membrane 410 may include multiple layers, e.g., the hydrophobic layer feed-side and the support layer permeate-side. The same happens as the cold chamber 320 of the second sub-module 300-2 is placed against the support layer of the membrane 410, i.e., any permeate that is produced inside the cold chamber 320 is directed to the discharge outlet 324. The cold chamber 320 of the first sub-module 300-1 and the hot chamber 310 of the second sub-module 300-2 need not be closed as no feed or permeate are flowing into or out of them. This is true for the MD module 400 that includes only two sub-modules 300.

For this configuration, the feed 316 may be stored in a feed tank 420, which is fluidly connected by corresponding piping 422 to the inlet 312 and outlet 324 of the hot chamber 310 of the first sub-module 300-1. A pump 424 may be connected to the piping 422 for pumping the feed 316 into the hot chamber 310 and taking the brine 318 back into the feed tank 420. The vapor 326 condenses into the cold chamber 320, because the thermocouple 200 cools down it. The condensate 327 accumulates into a permeate tank 430, which is fluidly connected with corresponding piping 432 to the outlet 324 of the cold chamber 320 of the second sub-module 300-2.

Figure 5A:
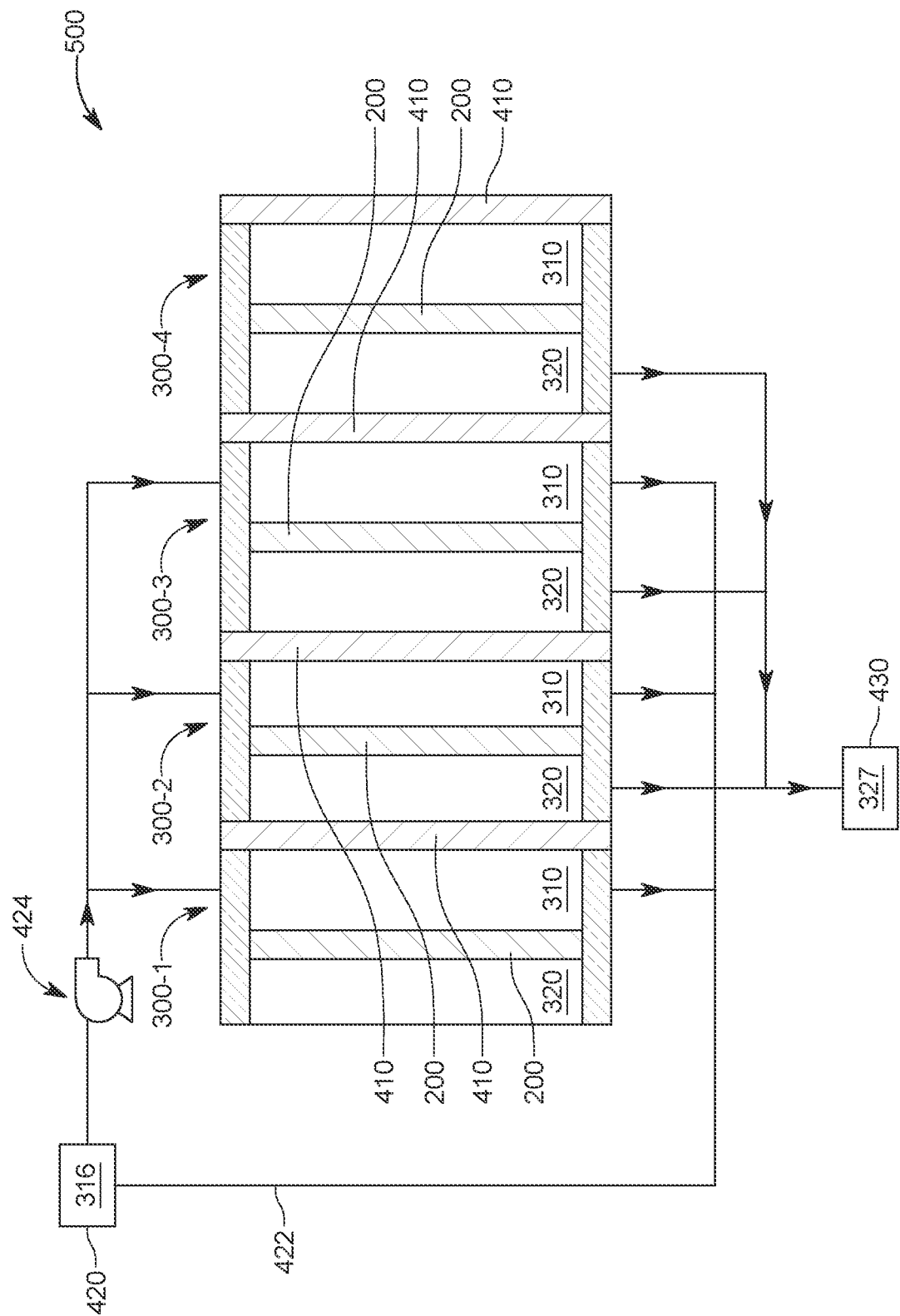
FIG. 5A illustrates an MD system having plural MD modules, and the hot chambers of the MD modules are fluidly connected in parallel to each other
Figure 5B:
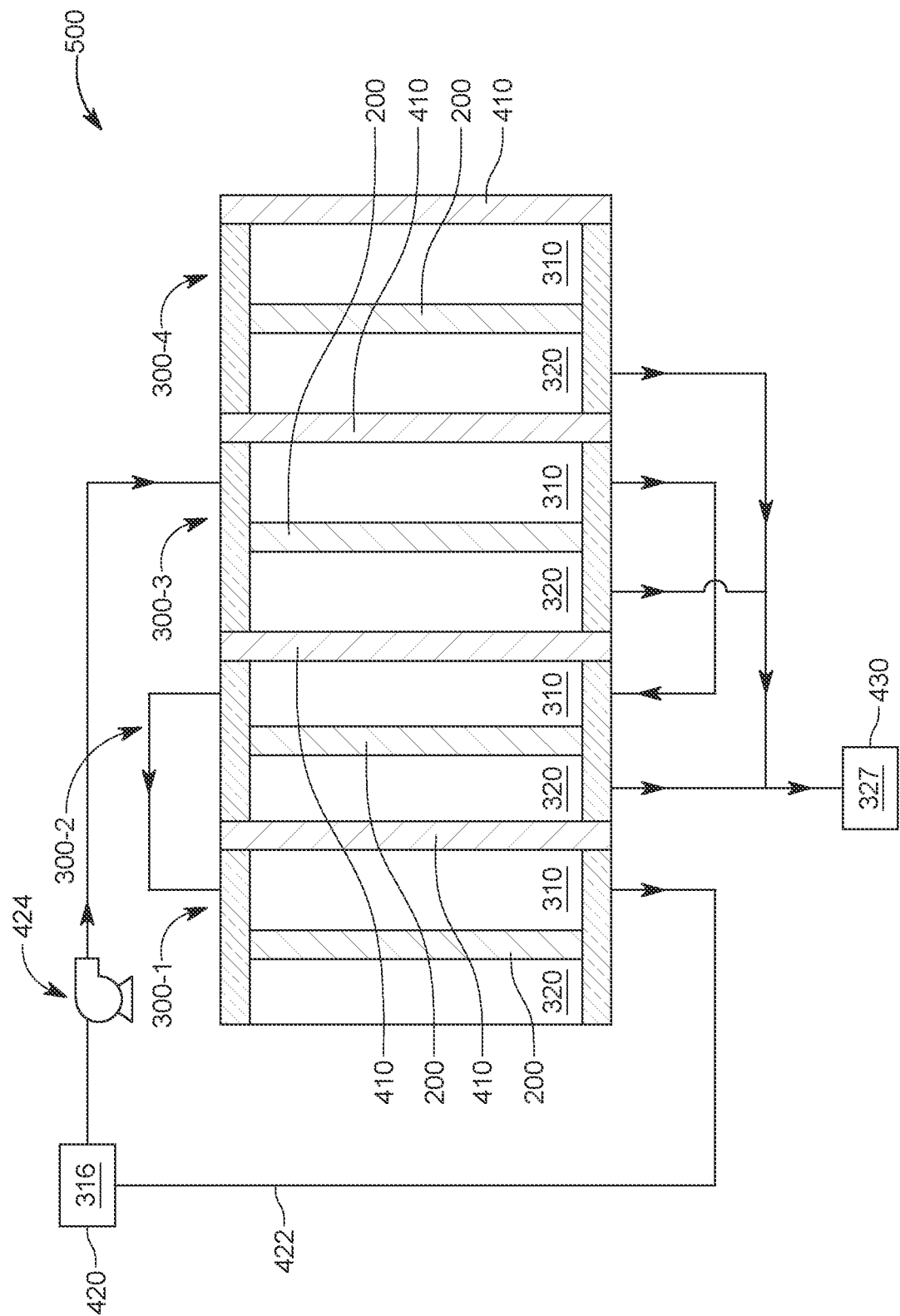
FIG. 5B illustrates an MD system having plural MD modules, and the hot chambers of the MD modules are fluidly connected in series to each other.
Figure 6:
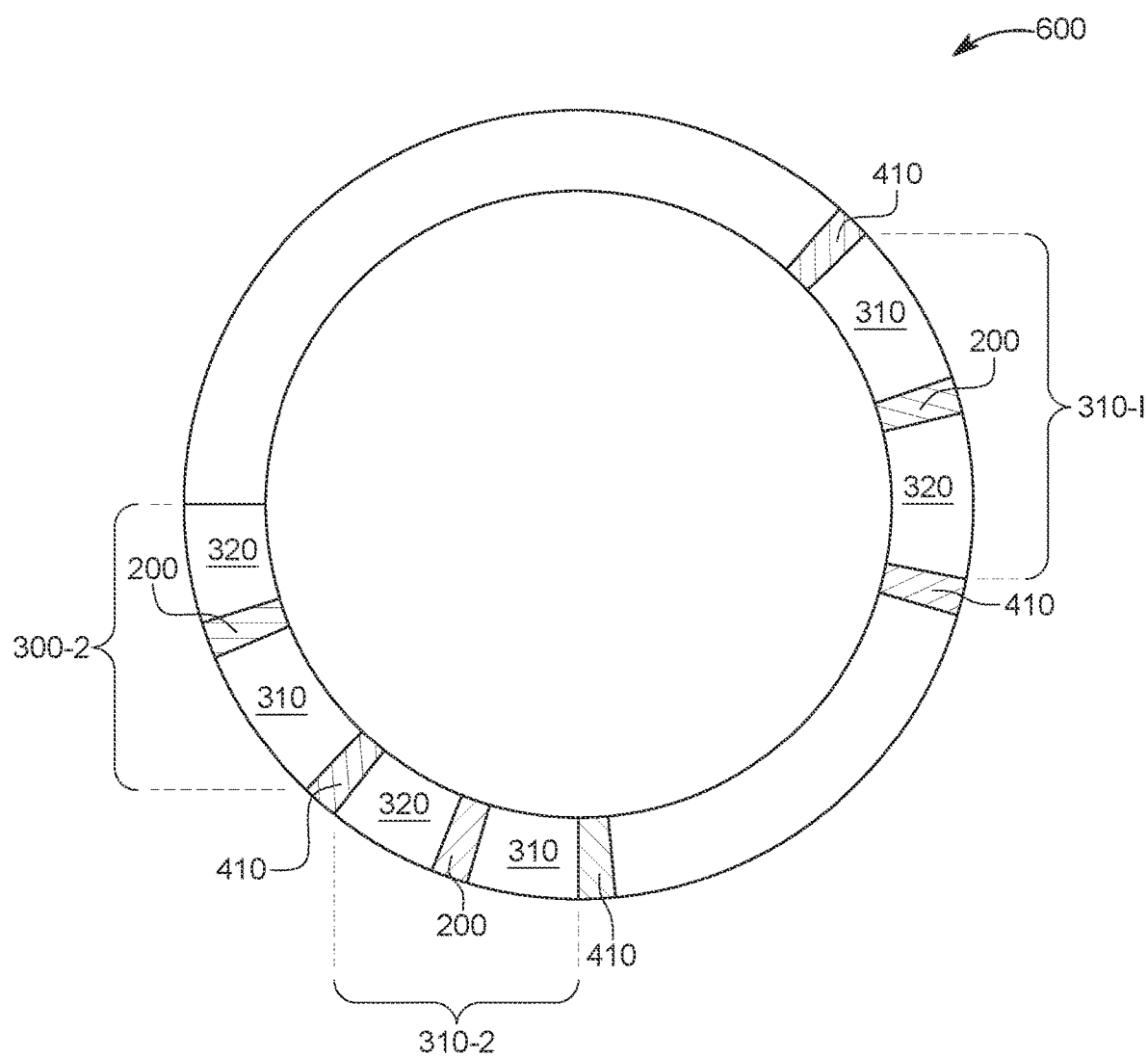
FIG. 6 illustrates another MD system having plural MD modules disposed along a closed curve.

However, if more sub-modules are connected to these two sub-modules, as illustrated in FIGS. 5A and 5B, then, the additional membranes will close the open chambers and a plural MD modules system 500 is obtained. Any number of sub-modules may be connected to each other. In one embodiment, as illustrated in FIG. 6, the sub-modules 300-1 may be shaped like wedges so that when connected to each other, they form a cylindrical system 600 having a circular cross-section. The cylinder is empty inside, the feed may be supplied from the top of the cylinder and the permeate may be collected to the bottom of the cylinder. Those skilled in the art would understand that the MD system 600 may follow other closed curves, for example, an ellipse, etc.

The sub-modules in the MD system 500 in FIGS. 5A and 5B or the system 600 in FIG. 6 may be fluidly connected in series or parallel in terms of the feed distribution. In this regard, FIG. 5A shows the feed 316 being distributed simultaneously to all the hot chambers of the various sub-modules, i.e., a parallel fluidic connection. Different from this embodiment, the embodiment illustrated in FIG. 5B shows the feed 316 being distributed from the feed tank 420 to a single sub-module, the brine from that sub-module is used as the feed for an adjacent module, and so on, i.e., a series fluidic connection of the hot chambers of the various sub-modules. The same is possible for the system 600.

While the embodiments discussed herein show the thermocouple 200 as being the only source for heating the feed and/or cooling the permeate, it is also possible to have an additional heater 440 (e.g., a Joule heater), as shown in FIG. 4, to further heat the feed 316. Although the additional heater 440 is shown in FIG. 4 being placed in the feed tank 420, the additional heater 440 may be placed anywhere along the piping 422. Similarly, although the embodiments discussed above show that the cold chamber of the thermocouple is the only source for cooling the permeate, it is possible to implement a chiller system for further cooling the permeate and/or the cold chamber.

Figure 7:
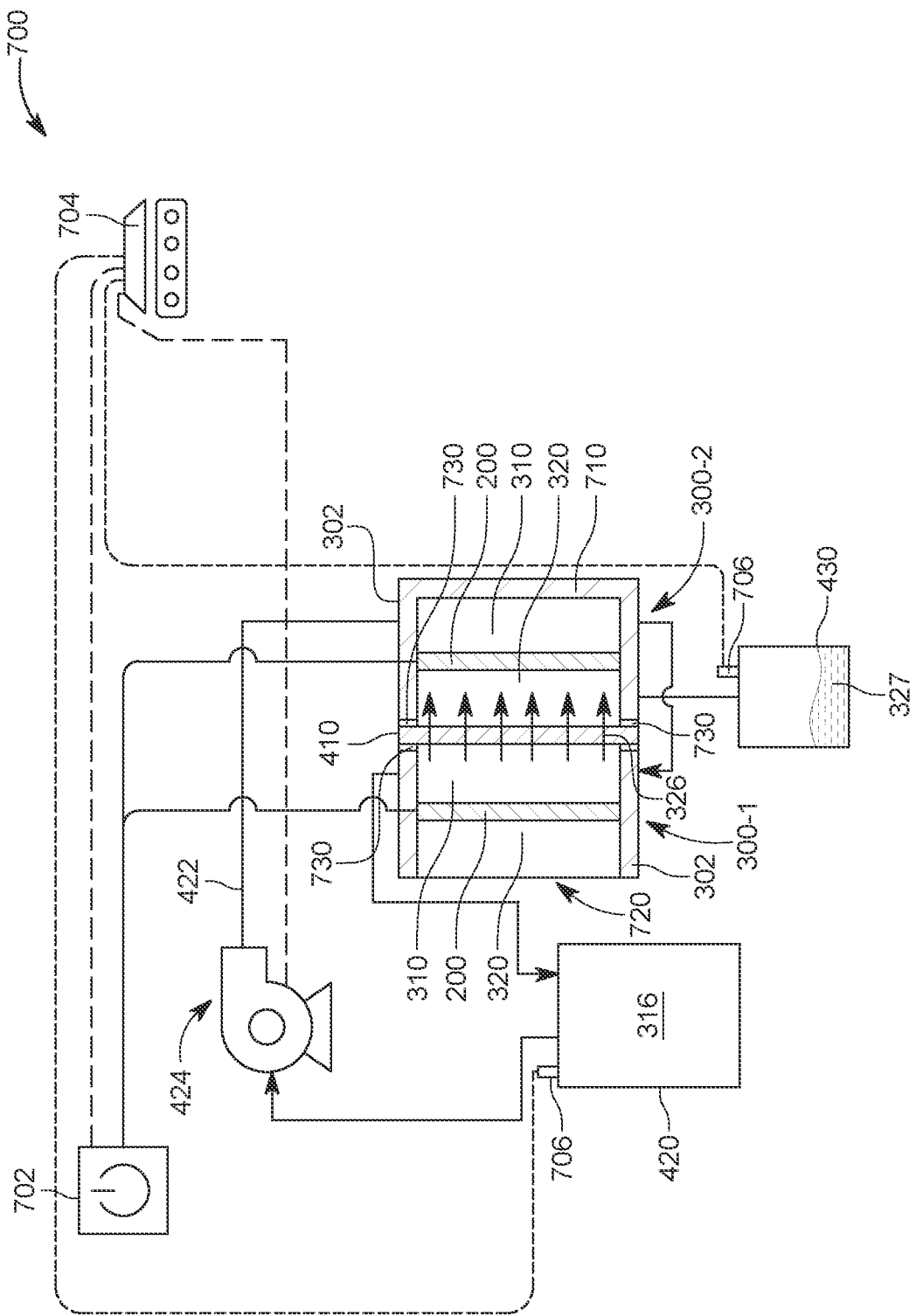
FIG. 7 illustrates a practical implementation of the MD system into a MD plant.

In one practical implementation, as illustrated in FIG. 7, an MD system 700 includes a membrane 410, and two MD sub-modules 300-1 and 300-2 that sandwich the membrane 410. More sub-modules may be used. The feed 316 is supplied from the feed tank 420 by a pump 424. A power source 702 (e.g., battery, fuel cell, solar panel, standard power supply from an outlet, etc.) is electrically connected to the thermocouples 200. Note that in this specific embodiment, when there are only two MD sub-modules, the thermocouple 200 of the first sub-module 300-1 is used to heat the hot chamber 310 of the first sub-module while the thermocouple 200 of the second sub-module 300-2 is used to cool the cold chamber 320 of the second sub-module. For these reasons, the cold chamber 320 of the first sub-module 300-1 could be open at 720, to the environment, while the hot chamber 310 of the second sub-module 300-2 is closed with an external wall 710. The external wall 710 may be implemented as a silicon membrane. In this way, the feed from the feed tank can be supplied by the pump 424, first to the hot chamber 310 of the second sub-module, and then to the hot chamber of the first sub-module, as illustrated in FIG. 7. The feed is then returned to the feed tank and recirculated. The vapor 326 that passes through the membrane 410, from the hot chamber of the first sub-module to the cold chamber of the second sub-module is condensed in the cold chamber of the second sub-module and then collected as permeate 327 at the permeate tank 430, as also shown in the figure.

In this embodiment, the first sub-module has the cold chamber open to the ambient and the cold chamber is not used in the distillation process while the last sub-module, i.e., the second sub-module in this case, has the hot chamber closed by an outside wall to prevent the feed to leak outside. To prevent the leaking of the permeate and/or feed from any of the chambers of the various sub-modules, a sealing material 730 (e.g., single or double parafilm) may be placed around the periphery of each sub-module, which directly faces the membrane, so that an interface between the membrane and the wall 302 of each sub-module is completely lined with the sealing material, as shown in the figure. FIG. 7 further shows an optional controller 704, for example, a processor, that is connected in a wired or wireless manner to various temperature sensors 706 for determining the temperature of the feed and/or the permeate, and also to the power source 702 and pump 424 for controlling them. In other words, the controller 704 may be programmed in hardware or software or both to control the amount of power or voltage that is applied by the power source 702 to the thermocouples 200, and also to control the amount of feed that is pumped by the pump 424 to the sub-modules.

Figure 8A:
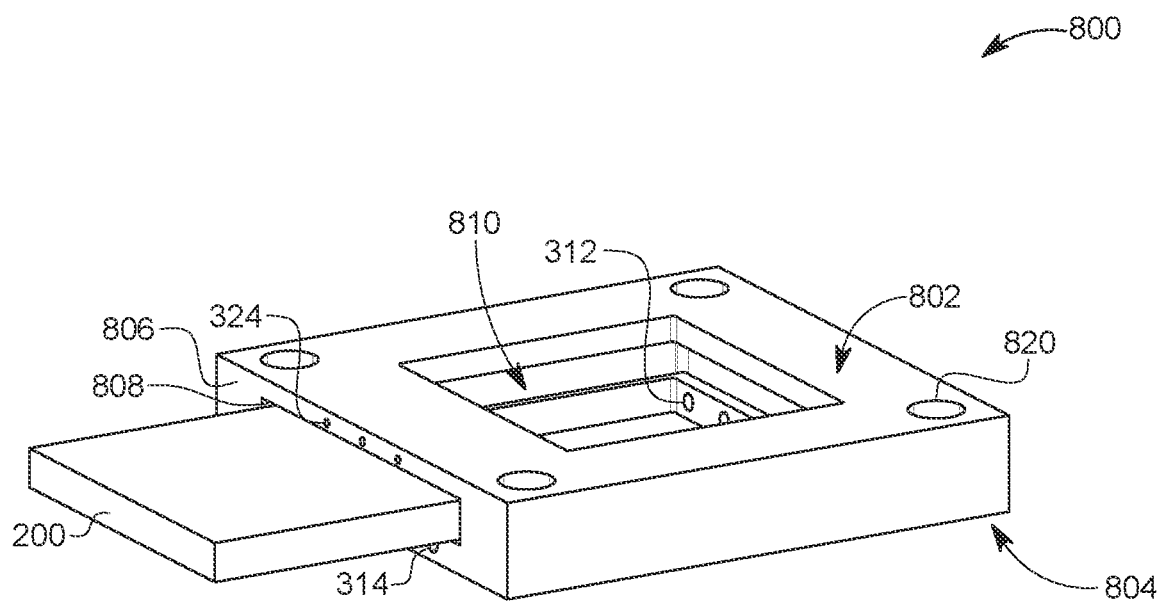
FIGS. 8A and 8B illustrate a body of the MD sub-modules discussed above.
Figure 8B:
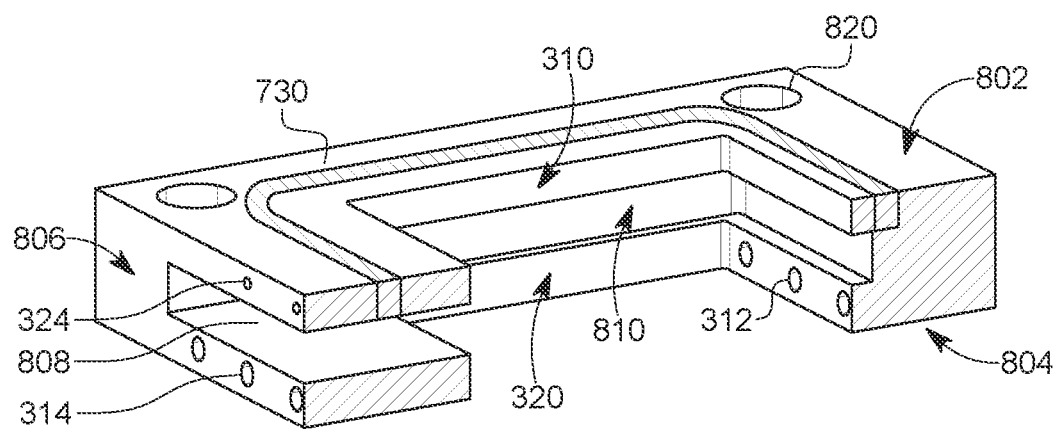

In one embodiment, as illustrated in FIGS. 8A and 8B, the sub-module 300 is implemented to have a body 800 made of a plastic or polymeric material. The body 800 may be 3D printed or molded by known means. Any other method may be used for making the body. The body 800 is shaped to be a rectangular prism (other shapes are also possible), having the two largest sides 802 and 804 open. A lateral side 806, which is smaller in size than the two largest sides 802 and 804, has an open slot 808, through which the thermocouple 200 is inserted inside the body 800. Corresponding grooves 810 are formed inside the body 800, to receive the thermocouple 200 and to fix it relative to the hot and cold chambers 310 and 320. Both chambers 310 and 320 are shown in the figures being open to the embodiment, similar to the embodiment shown in FIG. 3.

FIG. 8B is a cross-section of the body 800 shown in FIG. 8A. The figures also show plural holes 820 made perpendicular to the largest sides 802 and 804, and these holes are configured to allow bolts or similar elements to pass through. In this way, plural bodies 800 may be connected to each other as shown, for example, in the embodiments illustrated in FIGS. 4 to 5B. Other mechanisms for attaching the sub-modules to each other may be used, for example, welding if the bodies are made of an appropriate material that can welded, gluing, etc. If the membrane (not shown) is attached to the side 802, then the sealing material 730 may be provided as illustrated in FIG. 8B.

The membrane 410 discussed herein may be any commercial grade membrane. In one embodiment, the membrane 410 has an average pore size of about 0.20 μm, a porosity of about 40%, a thickness of about 0.1 μm, a liquid entry pressure of about 6.4 bar, and an active area (relative to the module used) of about 0.0011 m². Those skilled in the art would understand that these numbers are not restrictive, and one or more of these parameters may be modified by about 20% of the listed values without diminishing the efficiency of the membrane.

Figure 11:
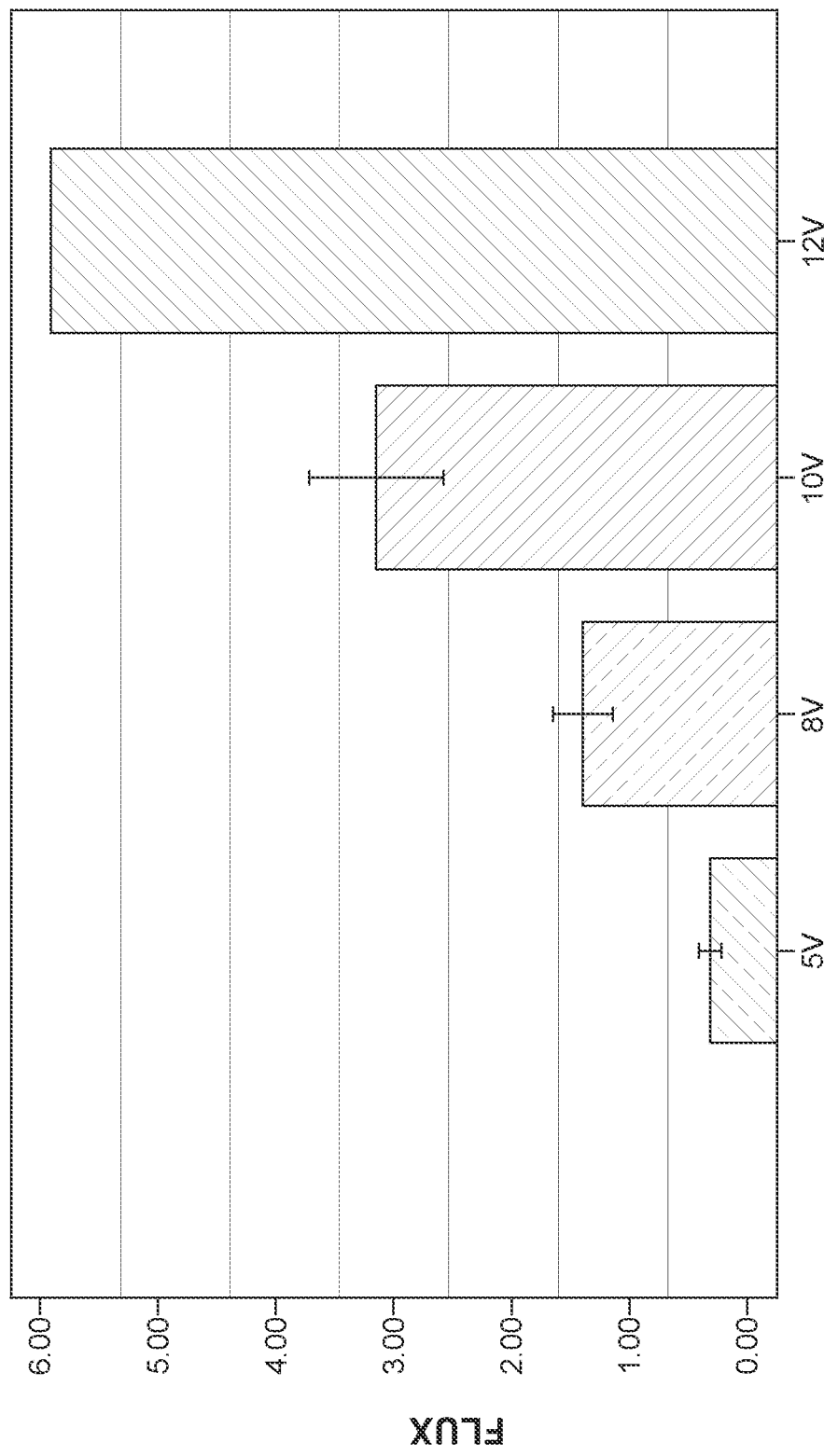
FIG. 11 illustrates the fluxes obtained with the MD system having thermocouples for various applied voltages.
Figure 12:
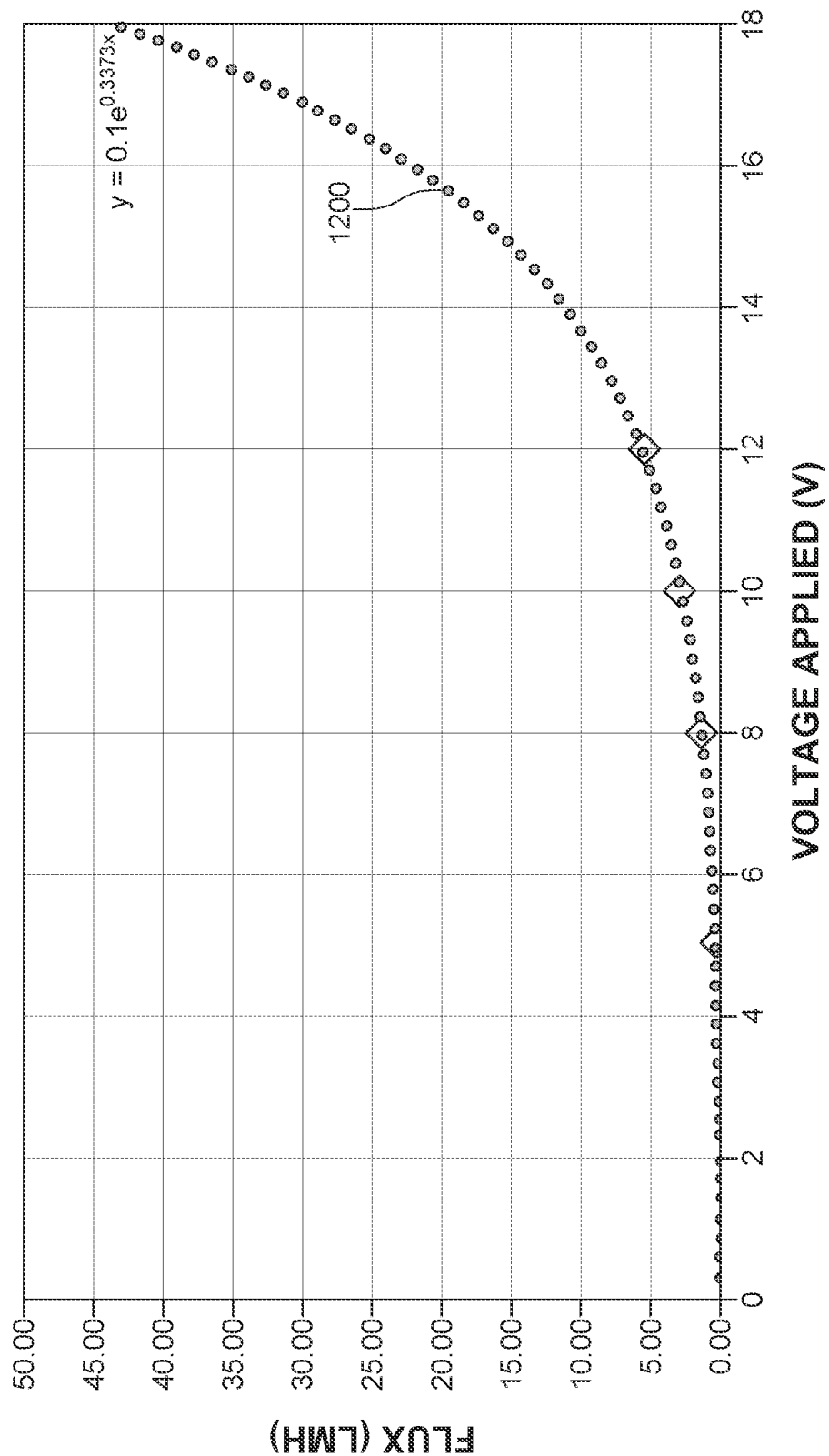
FIG. 12 shows a calculated curve that estimates the flux generated by the MD module having the thermocouple versus a voltage to be applied to the thermocouple.

Various experiments were performed with the systems discussed above to test their performance. With regard to the system shown in FIG. 4, in one experiment, the feed tank was kept at about 21° C., and various voltages between 1 and 12 V were applied to the thermocouple 200. Table 1 in FIG. 9 shows the energy consumption and the feed temperature obtained for each of these voltages. Based on this data, and the specific heat equation, the efficiency of the thermocouple has been calculated as illustrated in Table 2, in FIG. 10. It is noted that the efficiency of the system is highest at the lowest heat transfer. For the experiment, a median volt of 5V was chosen as the initial voltage and then the voltage was modified based on the resulting flux. At 5V the resulting flux was low, and thus, the applied voltages were increased to increase the flux. The flux results (measured in liters per area per time) obtained for various voltages are show in FIG. 11. Based on these results, it was calculated the dependency of the flux with the voltage applied to the thermocouple and the exponential curve 1200 shown in FIG. 12 was found to best describe this dependency. The diamonds in the figure indicate the actual measurements.

The heat transfer efficiency of the system can be calculated using the specific heat capacity formula and the energy required for evaporation. It was found, as shown in Table III in FIG. 13, that the system exhibits a low thermal efficiency. As the applied voltage was increased, so does the applied thermal energy, resulting in only 27% of the total applied energy at 12V being used to heat the feed. Similar but lower results occur at 10V, 8V and 5V. It is believed that this loss of thermal energy is due to the cooling energy that occurs at the other side of the same thermocouple due to the Peltier's effect. As the applied voltage increases, the temperature of the hot side further increases while the temperature of the cold side decreases. In one embodiment, the first thermocouple 200 in the system was operated at 12V, the second thermocouple was operated at a lower voltage, e.g., 10V, and so on. Thus, it is possible to operate the distillation system with the plural sub-modules with the thermocouples having different voltages. In one application, only a subset of the thermocouples have different voltages, while another subset are kept at the same voltage.

It is possible to increase the thermal efficiency of the systems discussed above, to more than 50%, at a flux higher than the mean of both fluxes due to the increased inlet feed temperature in the second and subsequent thermocouple sub-modules. When using a DCMD or an AGMD configuration, the elongation of the membrane past the thermocouple may help utilize the heat energy transferred to both the feed and permeate from the thermocouple. The elongation increases the membrane surface area in contact with the already heated feed and cooled permeate, respectively. Another possible way to overcome the observed low thermal efficiency, is to utilize the cooling feature of the thermocouple, where it could be applied in thermal desalination plant discharge streams. There, the thermocouple module could be operated at a low applied voltage and could utilize the high heat of the discharge to get a temperature difference sufficient to gain an adequate flux.

Figure 14:
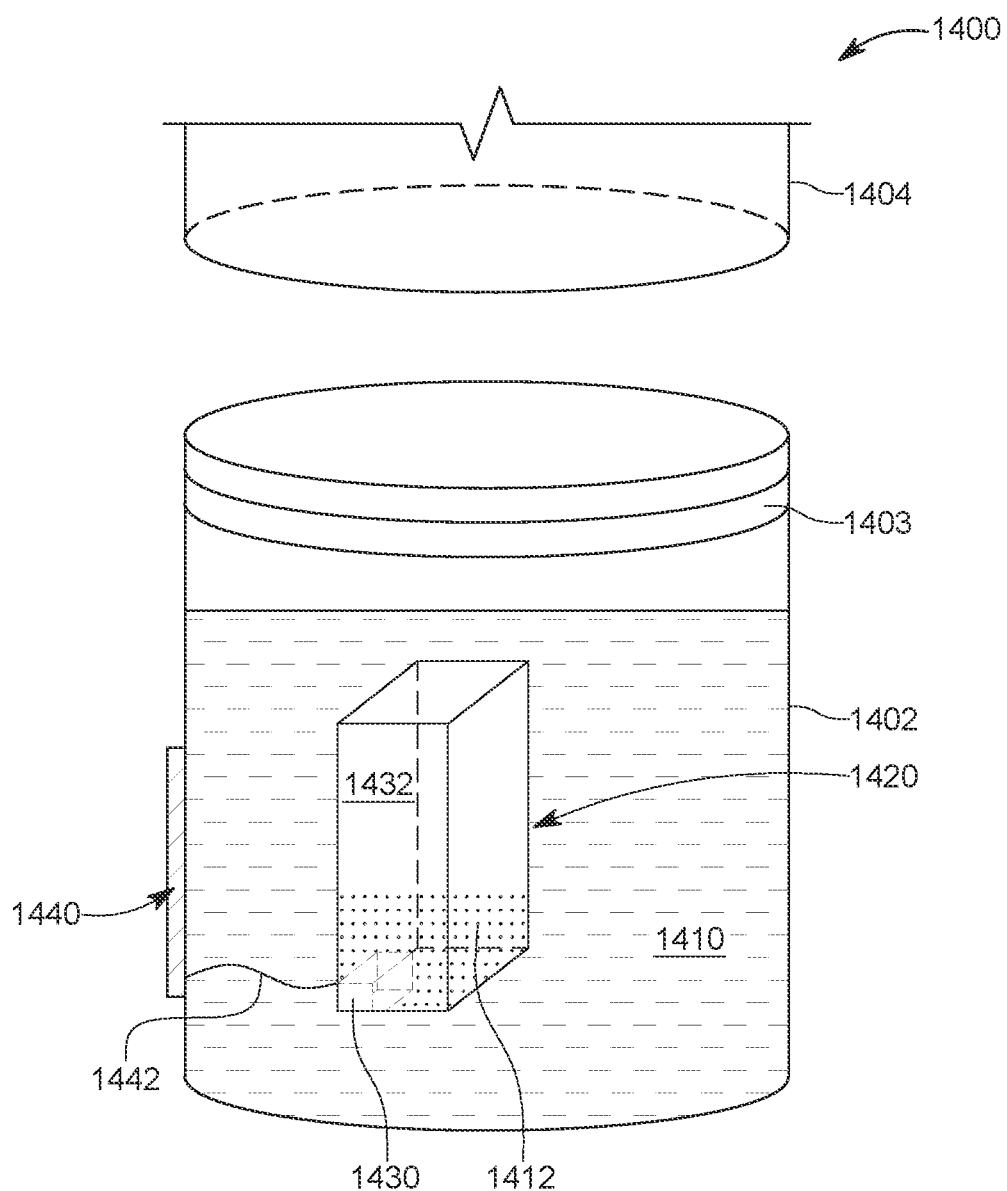
FIG. 14 illustrates a portable water distillation system that uses a distillation membrane and a thermocouple for generating a permeate from a feed.

The thermocouple module discussed above may be implemented not only in an industrial type water distillation plant, but also in smaller distillation units, for example, a survival kit. A survival kit may be the size of a cup and may be used by individuals when fresh water is not available, for example, during camping or outdoor training exercises. Such a portable survival kit, called herein distillation kit 1400, is shown in FIG. 14 including a vessel 1402 that may have a cap 1404. The vessel 1402 may have threads 1403 for receiving the cap 1404. A feed 1410 (may be salt water or dirty fresh water) is placed inside the vessel 1402 and a desalination module 1420 is also placed inside the vessel. If the cap 1404 is present, the cap is screwed to the vessel 1402 and the entire kit is left to work. The distillation kit 1400 is portable as its size is comparative to a water bottle.

Figure 15:
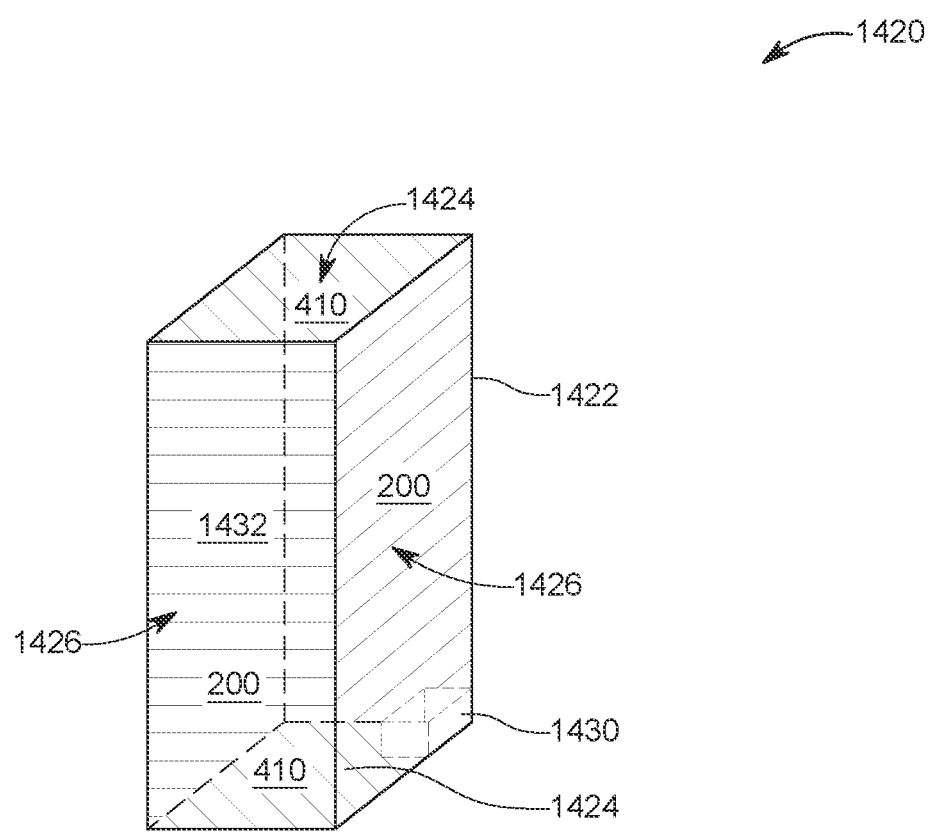
FIG. 15 shows in more detail a water distillation module that is used by the portable water distillation system shown in FIG. 14.

The desalination module 1420 may have any 3D shape. For simplicity, the desalination module 1420 is shown in the figure to be a rectangular prism. The desalination module 1420 is shown in more detail in FIG. 15, and it has a frame 1422 made of a metal or plastic or polymer material, one or more sides 1424 covered by a porous material (for example, the membrane 410) and one or more sides 1426 covered by corresponding one or more thermocouples 200. FIG. 15 shows the top and bottom side 1424 being covered with the membrane 410 and each of the four sides 1426 being covered with a corresponding thermocouple 200. Those skilled in the art would understand that any number of sides may be covered with the membrane and any number of sides may be covered with the thermocouple as long as one side is covered by a membrane and one side is covered by a thermocouple.

Inside the desalination module 1420 may be located a power source 1430 that supplies electrical power to the thermocouples 200. The power source may be a replaceable battery. In one embodiment, the power source 1430 is an interface that may be coupled to a solar panel 1440 located on an outside of the vessel 1402, as shown in FIG. 14. In this case, a wire connection 1442 may be established between the solar panel 1440 and the power source 1430. Other type of power sources may be used, for example, a fuel cell. In one embodiment, the solar panel 1440 is replaced with a hand cranked system for generating electricity or a small wind turbine. Any known energy source may be used to power the thermocouples 200.

Returning to FIG. 15, the thermocouples 200 are configured to be attached to the frame 1422 so that no brine from outside can enter the chamber 1432 defined by the membranes and thermocouples, except through the membranes 410. In other words, the thermocouples and the membranes are attached to the frame to seal the chamber 1432 so that only water vapors can enter inside the chamber through the membrane 410. Further, the thermocouples 200 are positioned around the frame 1422 or are energized so that all the cold sides are directly facing the chamber 1432 and all the hot sides are directly facing the feed, when placed in the vessel 1402. In this way, the feed is heated and the permeate inside the chamber 1432 is cooled, enhancing the distillation process. The permeate 1412 accumulates inside the chamber 1412 due to the distillation process promoted by the temperature difference between the outside and inside of the chamber. The reverse of this process is also possible, i.e., the thermocouples 200 are positioned with the hot sides facing the chamber 1402, and at least one wall of is a membrane. The feed is placed inside the chamber 1402 and the permeate accumulates in the cup 1402.

After the distillation module 1420 was placed inside the feed 1410 in the vessel 1402, and the distillation module 1420 was activated by providing power to the one or more thermocouples 200, the entire distillation kit 1400 may be left to rest so that the temperature difference between the inside and outside the chamber 1432 is achieved and the permeate 1412 is generated. After a given time, which is a priori calculated based on the size of the vessel, the type of the feed, the size of the distillation module 1420, and the power supply of the distillation module 1420, the cap 1404 of the distillation kit is removed (if present), the distillation module 1420 is removed from the feed, and the top membrane 410 or a thermocouple 200 is removed to obtain access to the permeate 1412 produced inside the chamber 1432. For this purpose, one of the membrane or the thermocouple is removably attached to the frame 1422, for example, with screws, or a small orifice is made in one of these sides and a straw is used to drink the permeate. The small orifice may then be closed with a small cap and the distillation kit can be reused.

Figure 16:
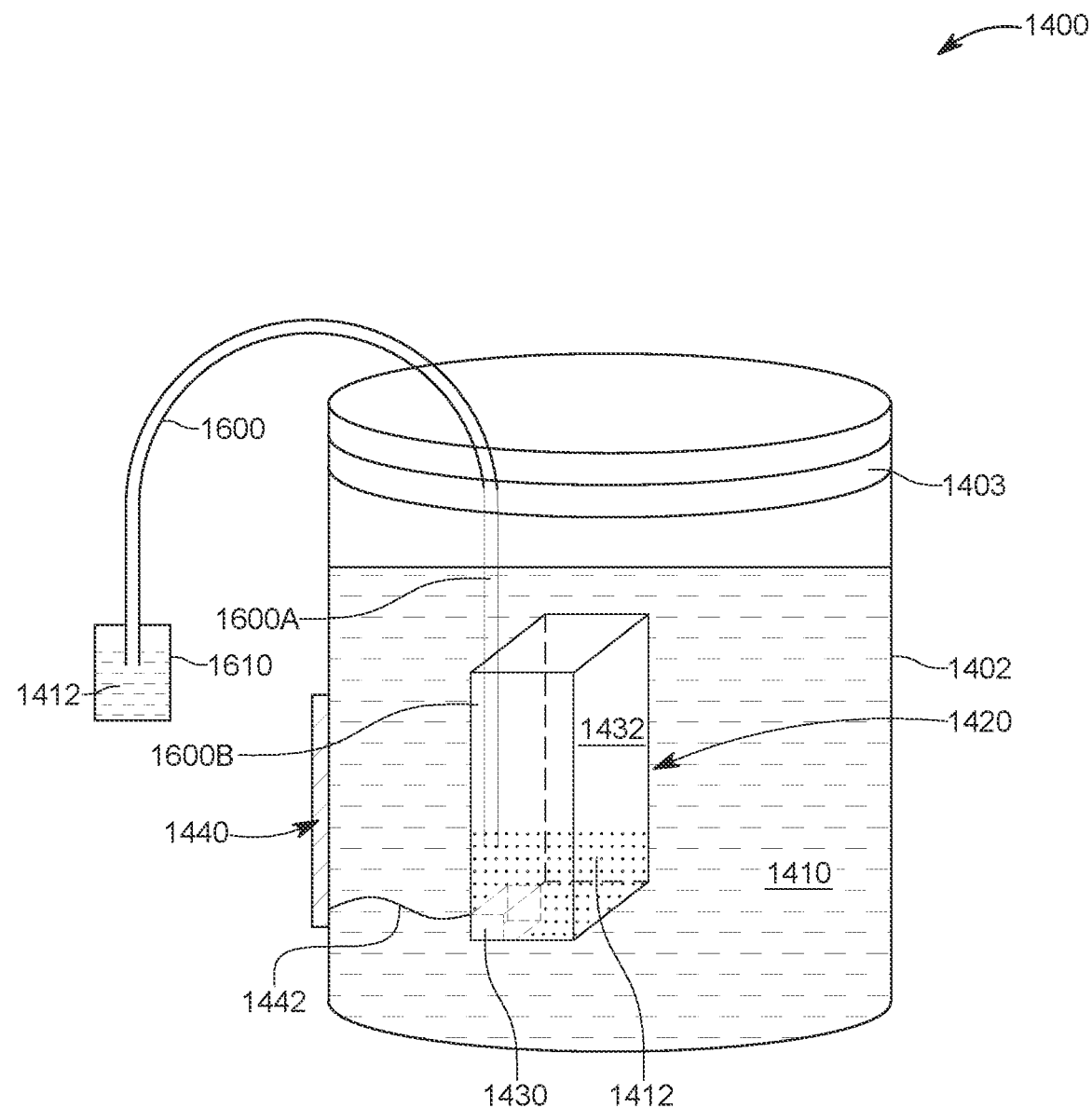
FIG. 16 illustrates another portable water distillation system that uses a distillation membrane and a thermocouple for generating a permeate from a feed and also uses nanofibers for removing the permeate from the system.

The embodiment discussed above needs to open up the distillation module for reaching the permeate. However, in the embodiment illustrated in FIG. 16 it is possible to continuously extract the permeate outside the chamber 1432, by providing one or more nanofibers 1600 that transport the permeate 1412, through capillarity, from the bottom of the distillation module 1420, to an exterior container 1610. Note that no cap is used for the vessel 1402 in this embodiment. Thus, with this arrangement, the generated permeate 1412 is continuously removed outside the vessel 1402. To prevent the nanofibers 1600 to be contaminated by the feed 1410, the part 1600A of the nanofiber 1600 that is directly exposed to the feed 1410 may be coated with a protective substance, so that no feed enters inside the nanofiber, while the part 1600B of the fiber that is inside the chamber 1432 is porous and can absorb the permeate.

Figure 17:
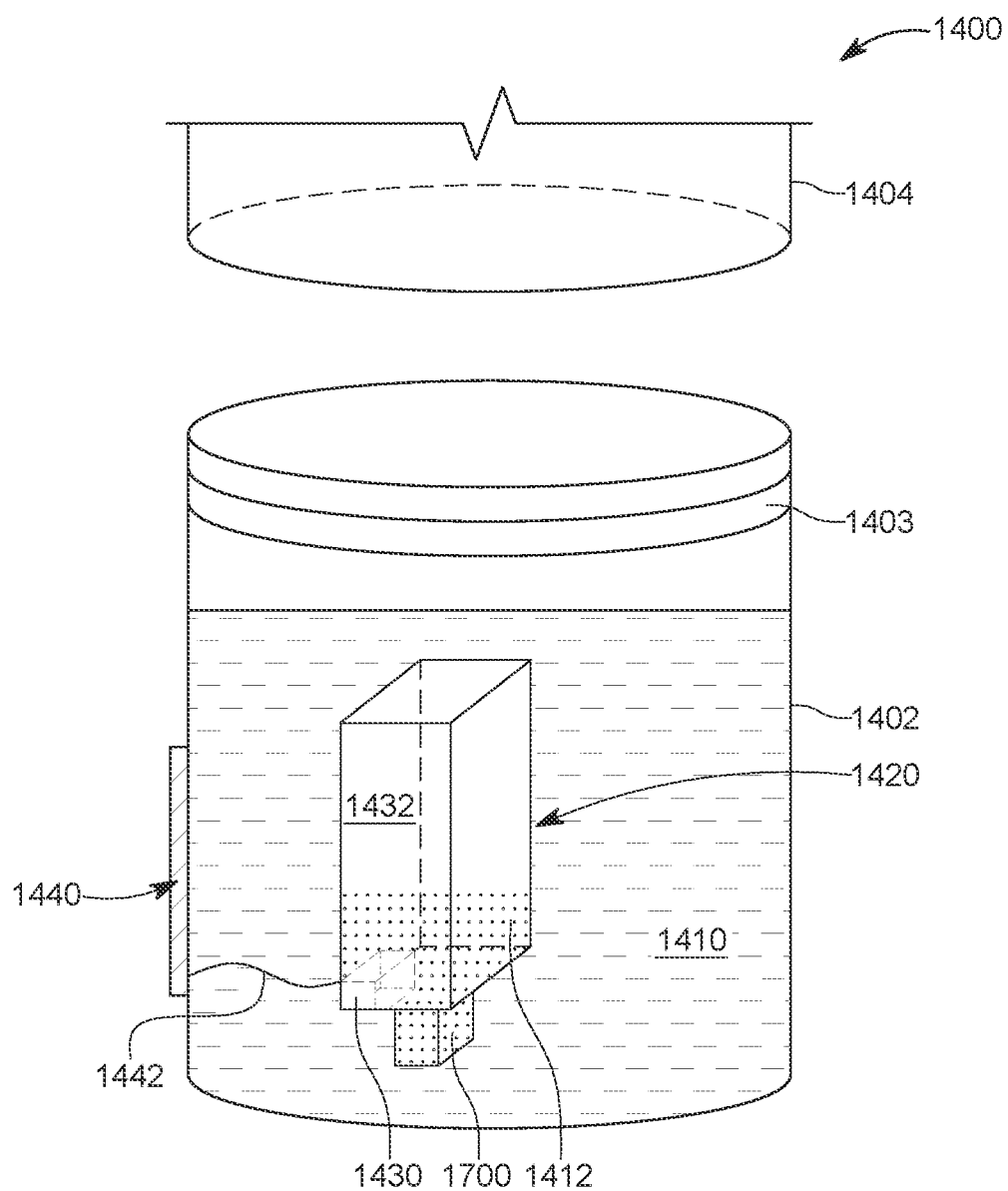
FIG. 17 illustrates still another portable water distillation system that uses a distillation membrane and a thermocouple for generating a permeate from a feed and collects the permeate in a cup located at the bottom of the system.

In another embodiment, as illustrated in FIG. 17, it is possible to attach a cup 1700 to the bottom of the distillation module 1420 and make a conduit (opening) through the bottom face (thermocouple or membrane), to fluidly and directly communicate the chamber 1432 with the cup 1700. In this way, the permeate 1412 flows due to the gravity into the cup 1700, and then the user can simply remove the cup from the bottom of the distillation module 1420 to obtain access to the permeate. The cup 1700 may be attached to the membrane 410 or to the frame 1422 in any known way. In this application, the cup 1700 needs to be thermally insulated so that a heat transfer from the feed 1410 to the permeate 1412 in the cup 1700 is minimized.

The disclosed embodiments provide a distillation system that uses a thermocouple to heat the feed. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A membrane distillation (MD) module comprising:
a first MD sub-module including a first thermocouple, the first thermocouple being fully located within the first MD sub-module;
a second MD sub-module including a second thermocouple, the second thermocouple being fully located within the second MD sub-module; and
a distillation membrane sandwiched between the first MD sub-module and the second MD sub-module,
wherein a hot chamber of the first MD sub-module is closed by the distillation membrane, and
wherein a cold chamber of the second MD sub-module is closed by the distillation membrane.

2. The MD module of claim 1, wherein the hot chamber has an input for receiving a feed at ambient temperature, and an output for discharging a brine, and the cold chamber has an output for discharging a permeate.

3. The MD module of claim 2, wherein the hot chamber is configured to heat the brine inside the module and the cold chamber is configured to cool the permeate.

4. The MD module of claim 1, wherein a cold chamber of the first MD sub-module and a hot chamber of the second MD sub-module are free of the feed, the brine, or the permeate.

5. The MD module of claim 1, wherein the feed is heated only in the hot chamber of the first MD sub-module and the permeate is cooled only in the cold chamber.

6. The MD module of claim 1, wherein the first and second thermocouples use the Peltier effect.

7. The MD module of claim 1, wherein the hot chamber of the first MD sub-module has an input and an output and the cold chamber of the second MD sub-module has only an output.

8. A membrane distillation (MD) system comprising:
plural MD sub-modules, each MD sub-module including a corresponding thermocouple, the corresponding thermocouple being fully located within the MD sub-module; and
plural distillation membranes interleaved with the plural MD sub-modules so that each distillation membrane of the plural distillation membranes is sandwiched between a hot chamber of a given MD sub-module and a cold chamber of an adjacent MD sub-module of the plural MD sub-modules,
wherein the hot chamber is directly facing a hot part of a corresponding thermocouple of the given MD sub-module, and
wherein the cold chamber is directly facing a cold part of a corresponding thermocouple of the adjacent MD sub-module.

9. The MD system of claim 8, wherein all inputs of the hot chambers of the plural MD sub-modules are fluidly connected, in parallel, to a feed source, and all outputs of the hot chambers are fluidly connected, in parallel, to each other to receive a brine.

10. The MD system of claim 9, wherein all outputs of the cold chambers of the plural MD sub-modules are fluidly connected, in parallel, to each other to receive a permeate.

11. The MD system of claim 10, wherein the cold chambers have only outputs, and no inputs.

12. The MD system of claim 8, wherein all the hot chambers of the plural MD sub-modules are fluidly connected, in series, to each other, to receive a feed and all outputs of the cold chambers of the plural MD sub-modules are fluidly connected, in parallel, to each other to collect a permeate.

13. The MD system of claim 12, wherein the cold chambers have only outputs, and no inputs.

14. The MD system of claim 8, wherein the plural MD sub-modules are distributed along a closed curve so that each hot and cold chamber is bordered by a corresponding membrane and a corresponding thermocouple.

15. The MD system of claim 8, wherein the hot chamber is configured to heat a feed and the cold chamber is configured to cool a permeate, and the feed is heated only in the hot chamber and the permeate is cooled only in the cold chamber.

16. The MD system of claim 8, wherein the thermocouple uses the Peltier effect.

* * * * *